United States Patent
Seidel et al.

(10) Patent No.: US 9,350,504 B2
(45) Date of Patent: *May 24, 2016

(54) METHOD AND SYSTEM FOR USING SELECTED BEARER CHANNELS

(71) Applicant: Raytheon Company, Waltham, MA (US)

(72) Inventors: Scott Y. Seidel, Fairfax, VA (US); Michael R. Franceschini, Centerport, NY (US)

(73) Assignee: Raytheon Company, Waltham, MA (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/270,023

(22) Filed: May 5, 2014

(65) Prior Publication Data

US 2014/0328221 A1  Nov. 6, 2014

Related U.S. Application Data

(63) Continuation of application No. 11/595,542, filed on Nov. 10, 2006, now Pat. No. 8,718,555.

(51) Int. Cl.
| | |
|---|---|
| *H04L 5/00* | (2006.01) |
| *H04W 72/04* | (2009.01) |
| *H04W 84/18* | (2009.01) |
| *H04L 5/14* | (2006.01) |
| *H04W 92/18* | (2009.01) |

(52) U.S. Cl.
CPC ............ *H04L 5/0032* (2013.01); *H04L 5/0073* (2013.01); *H04L 5/14* (2013.01); *H04W 72/0406* (2013.01); *H04W 84/18* (2013.01); *H04W 92/18* (2013.01)

(58) Field of Classification Search
CPC ........... H04L 5/00; H04L 5/14; H04L 5/0032; H04L 5/0073; H04W 84/18
See application file for complete search history.

(56) References Cited

U.S. PATENT DOCUMENTS

2006/0104301 A1* 5/2006 Beyer .................... H04J 3/0667 370/445
2009/0074404 A1* 3/2009 Suryaputra ............. H04L 12/24 398/5

* cited by examiner

*Primary Examiner* — Anez Ebrahim
(74) *Attorney, Agent, or Firm* — Strategic Patents, P.C.

(57) ABSTRACT

Using bearer channels for wireless nodes includes initiating communication among the wireless nodes that include a node and one or more neighbor nodes. An adaptive channel operable to communicate messages between the node and the neighbor nodes is established. One or more bearer channels are selected. The one or more neighbor nodes are notified of the one or more selected bearer channels using the adaptive channel. The node and the neighbor nodes communicate over the bearer channels.

20 Claims, 4 Drawing Sheets

METHOD AND SYSTEM FOR USING SELECTED BEARER CHANNELS

CROSS-REFERENCE TO RELATED APPLICATIONS

This application is a continuation of U.S. patent application Ser. No. 11/595,542 filed Nov. 10, 2006, which is hereby incorporated by reference in its entirety.

GOVERNMENT FUNDING

The U.S. Government may have certain rights in this invention as provided for by the terms of Contract No. F30602-03-C-0079 awarded by the United States Air Force Research Laboratory as agent for the Defense Advanced Research Projects Agency (DARPA).

TECHNICAL FIELD

This invention relates generally to the field of wireless communications and more specifically to a method and system for using selected bearer channels.

BACKGROUND

Nodes of a wireless communication system communicate over bearer channels. There are known techniques for using selected bearer channels for transmission. According to a frequency division duplexing (FDD) technique, one channel is used for downlink transmission from a base station node to a remote node, and another channel is used for uplink transmission from the remote node to the base station node. According to a time division duplexing (TDD) technique, a common bearer channel is used for both uplink and downlink transmissions, where uplink and downlink transmissions alternately take turns transmitting on the channel. These known techniques, however, are not suitable for using selected bearer channels in certain situations.

SUMMARY OF THE DISCLOSURE

In accordance with the present invention, disadvantages and problems associated with previous techniques for using selected bearer channels for wireless nodes may be reduced or eliminated.

According to one embodiment of the present invention, using bearer channels for wireless nodes includes initiating communication among the wireless nodes that include a node and one or more neighbor nodes. An adaptive channel operable to communicate messages between the node and the neighbor nodes is established. One or more bearer channels are selected. The one or more neighbor nodes are notified of the one or more selected bearer channels using the adaptive channel. The node and the neighbor nodes communicate over the bearer channels.

Certain embodiments of the invention may provide one or more technical advantages. A technical advantage of one embodiment may be that individual nodes are operable to independently select bearer channels used for communication between the nodes. Accordingly, other network nodes do not need to select identical bearer channels.

A technical advantage of another embodiment may be that example methods for using selected bearer channels for wireless nodes are provided. As a first example, a transmission may use the bearer channel of a transmitting node for communication between the transmitting node and a destination node. As a second example, the transmission may use the bearer channel of a destination node. As a third example, each node may use bearer channels selected on a link-by-link basis. As a fourth example, a master node may select a bearer channel for use by the nodes of the network.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
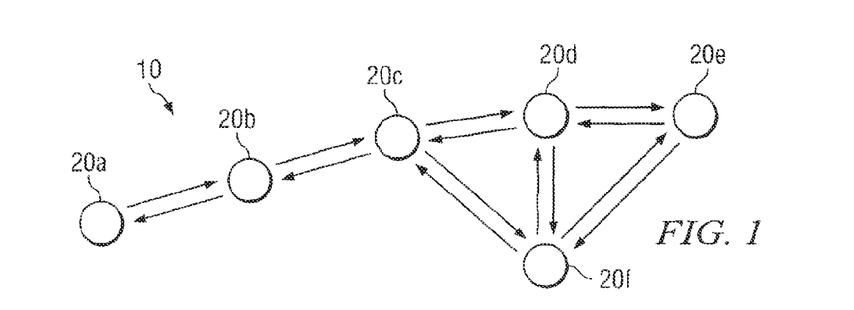
FIG. 1 is a diagram illustrating one embodiment of a network of nodes for which bearer channels may be selected.

FIG. 1 is a diagram illustrating one embodiment of a network 10 of nodes 20 for which bearer channels may be selected. According to the embodiment, nodes 20 are operable to independently select bearer channels used for communication, so other network nodes are not required to select the same bearer channels as one another. Example methods for communicating over the selected bearer channels may be used. As a first example, a transmission may use the bearer channel of a transmitting node for communication between the transmitting node and a destination node. As a second example, the transmission may use the bearer channel of a destination node. As a third example, each node may use bearer channels selected on a link-by-link basis. As a fourth example, a master node may select a bearer channel for use by the nodes of network 10.

Network 10 includes devices. In general, a device may include any suitable arrangement of components operable to perform the operations of the device. Components may include logic, an interface, memory, other component, or any suitable combination of the preceding. "Logic" may refer to hardware, software, or a combination of hardware and software. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, network 10 includes nodes 20. A node 20 represents any suitable device operable to communicate with another node 20. Node 20 may comprise, for example, a personal digital assistant, a computer such as a laptop, a cellular telephone, a mobile handset, or any other device operable to communicate with another node 20. A node 20 may have any suitable mobility capability, for example, be stationary or mobile. Nodes 20 may be organized in a base station/remote network topology, a mobile ad-hoc network topology, or any suitable network topology.

Nodes 20 communicate using signals. A signal may have any suitable modulation format and any suitable bandwidth. Signals communicate information. Information may include voice, data, text, audio, video, multimedia, control, signaling, other information, or any combination of the preceding. The information may be communicated in packets. A packet may comprise a bundle of data organized in a specific way for transmission, and a frame may comprise the payload of one or more packets organized in a specific way for transmission.

According to one embodiment, a network 10 may have one or more bearer channels simultaneously selected by nodes 20. The channel selection may be made according to any suitable method. The bearer channels may be used for communications among nodes 20 according to any suitable method. A procedure according to which a method may be selected from a set of example methods is described in more detail with reference to FIG. 2. The set of example methods includes a transmitter-oriented method, a destination-oriented method, a link-oriented method, and a group-oriented method. Any suitable procedure for selecting a method from any suitable set of methods, however, may be used.

Bearer channels selected for use by a node 20 may change independently from the method for using the selected bearer channels. The method uses the current bearer channel that was selected by any suitable means.

Modifications, additions, or omissions may be made to network 10 without departing from the scope of the invention. The components of network 10 may be integrated or separated according to particular needs. Moreover, the operations of network 10 may be performed by more, fewer, or other modules. Additionally, operations of network 10 may be performed using any suitable logic.

Figure 2:
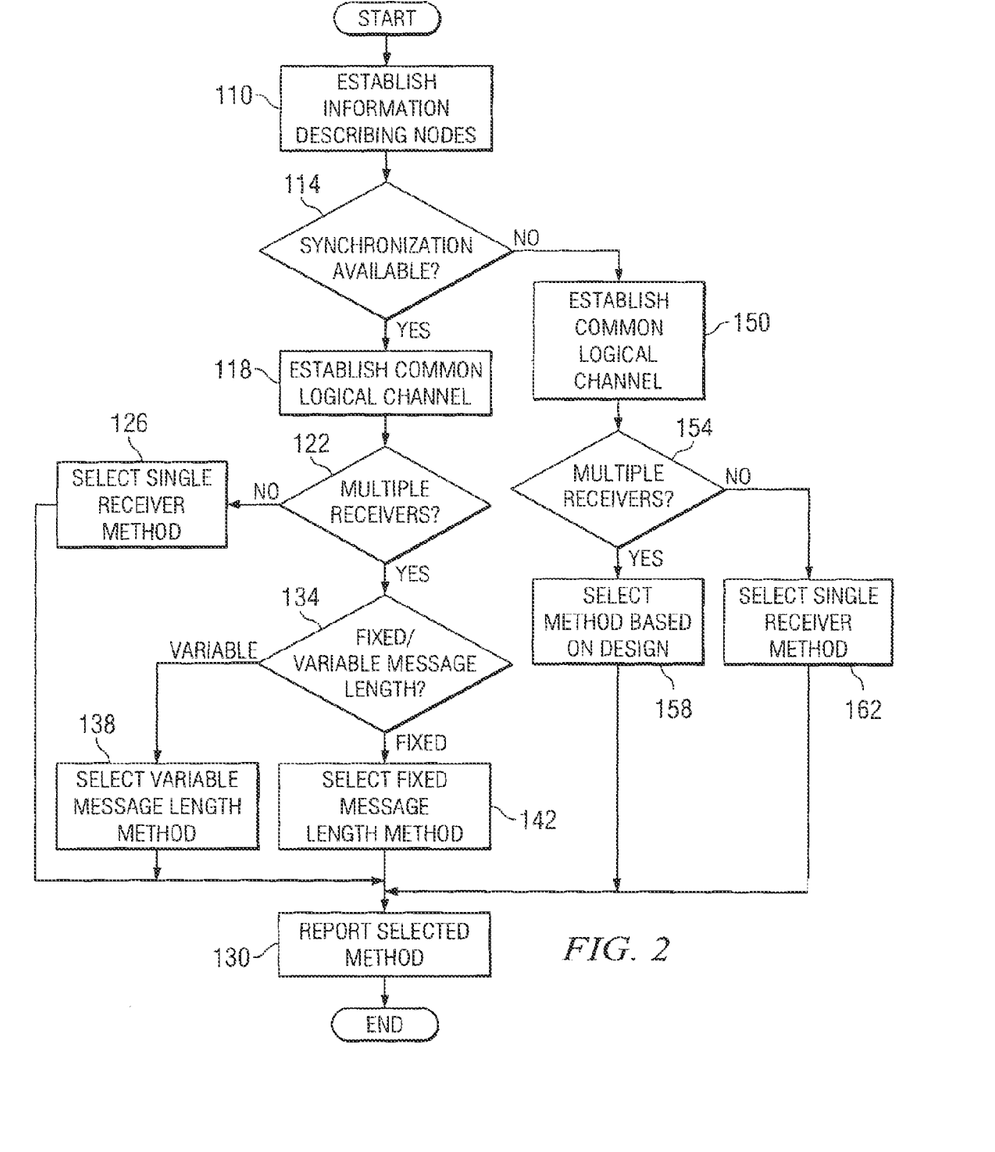
FIG. 2 is a flowchart illustrating one embodiment of procedure for identifying an appropriate method for using selected bearer channels.

FIG. 2 is a flowchart illustrating one embodiment of a procedure for identifying an appropriate method for using selected bearer channels. The technique may be used to identify methods for any suitable network of nodes, such as network 10 of nodes 20 of FIG. 1.

The procedure begins at step 110, where information describing network 10 of nodes 20 is established. Time synchronization may be available among nodes 20 at step 114. Time synchronization may refer to highly accurate time synchronization. If time synchronization is available, nodes 20 may utilize a time division multiple access (TDMA) technique, a carrier sense multiple access (CSMA) technique, or other suitable technique. If time synchronization is not available, nodes 20 may utilize a CSMA technique or other suitable technique.

If time synchronization is available at step 114, the procedure proceeds to step 118, where a common logical channel is determined. Nodes 20 may have multiple receivers at step 122. If nodes 20 do not have multiple receivers at step 122, the procedure proceeds to 126, where a method appropriate for single receiver nodes 20 is selected. Single receiver methods may include, for example, a single receiver destination-oriented method, a single receiver transmitter-oriented method, or a group-oriented method. A single receiver transmitter-oriented method is described with reference to FIG. 3. A single receiver destination-oriented method is described with reference to FIG. 5. A group-oriented method is described with reference to FIG. 8. After a single receiver method is selected, the procedure proceeds to step 130.

If nodes 20 have multiple receivers at step 122, the procedure proceeds to step 134. The frames of the message traffic may have a variable message length or a fixed method length at step 134. If the message length is variable at step 134, the procedure proceeds to step 138. A method appropriate for a variable message length is selected at step 138. Methods appropriate for a variable message length may include a multiple receiver destination-oriented method, a link-oriented method, or a group-oriented method. A multiple receiver destination oriented method is described with reference to FIG. 6. A link-oriented method is described with reference to FIG. 7. The procedure then proceeds to step 130.

If the message length is fixed at step 134, the procedure proceeds to step 142. A method appropriate for a fixed message length is selected at step 142. Methods appropriate for a fixed message length may include, for example, a multiple receiver transmitter-oriented method, a link-oriented method, or a group-oriented method. A multiple receiver transmitter-oriented method is described with reference to FIG. 4. The procedure then proceeds to step 130.

If time synchronization is not available at step 114, the procedure proceeds to step 150, where a common logical channel is determined. Nodes 20 may have multiple receivers at step 154. If nodes 20 have multiple receivers at step 154, the procedure proceeds to step 158, where a selection method is selected in accordance with the design of nodes 20. As an example, a destination-oriented method, a transmitter-oriented method, a link-oriented method, or a group-oriented method may be selected. The procedure then proceeds to step 130.

If nodes 20 do not have multiple receivers at step 154, the procedure proceeds to step 162, where a single receiver method is selected. A single receiver method may include, for example, a single receiver destination-oriented method or a group-oriented method. After a single receiver method is selected, the procedure proceeds to step 130. At step 130, the selected method is reported. After reporting the selected method, the procedure terminates.

Modifications, additions, or omissions may be made to the procedure without departing from the scope of the invention. The procedure may include more, fewer, or other steps. Additionally, steps may be performed in any suitable order without departing from the scope of the invention.

Figure 3:
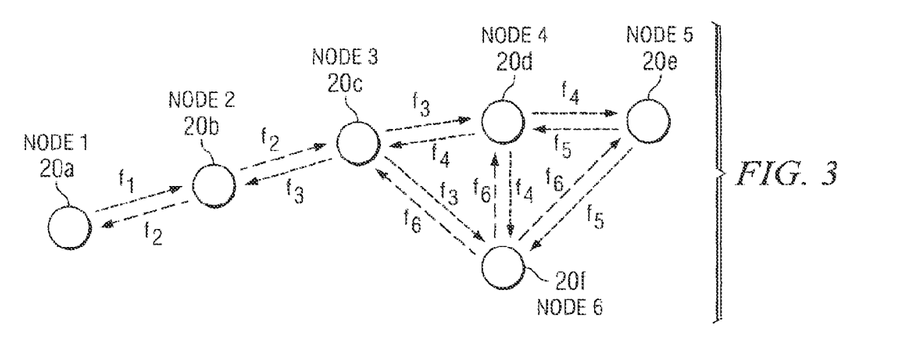
FIG. 3 is a diagram illustrating one embodiment of a transmitter-oriented (TO) method for using selected bearer channels for wireless nodes having a one or more receivers.

FIG. 3 is a diagram illustrating one embodiment of a transmitter-oriented (TO) method for using selected bearer channels for nodes having one or more receivers. The method may be used for any suitable network of nodes, such as network 10 of nodes 20 of FIG. 1. According to the embodiment, nodes 20 may operate according to a time division multiple access (TDMA) technique.

According to the illustrated embodiment, each node 20 transmits using its own selected bearer channel. In the example, node 1 transmits over channel $f_1$, node 2 transmits over channel $f_2$, node 3 transmits over channel $f_3$, node 4 transmits over $f_4$, node 5 transmits over channel $f_5$, and node 6 transmits over channel $f_6$. Different nodes 20 may select the same or different bearer channels. As an example, channels $f_1$ and $f_3$ may be equal to each other, and channels $f_1$, $f_2$, $f_4$, and $f_5$ maybe different from each other.

According to one embodiment, a frame may be used to organize a collection of consecutive TDMA time slots. The frames may include, for example, one or more network entry slots, one or more control slots, one or more data slots, one or more other slots, or any combination of the preceding. Network entry slots may be used to join a network and indicate selected bearers. Control slots may include information used to designate current and future bearer channels. Data slots may be used for data payload. Slots may go unused when there is no data to send, or dummy payloads may be used to fill unused slots. The frequency of the network entry slot may be determined according to any suitable method. In one embodiment, the frequency may be a pre-assigned fixed channel. In other embodiments, the frequency may be a dynamically changing channel determined according to any suitable procedure.

According to the TDMA technique, a schedule is established according to any suitable method to define the specific time slots that a node 20 uses for transmission. In one embodiment, each node 20 may be assigned a fixed time slot in every repeating frame. In other embodiments, the time slots may be dynamically assigned by a master node or according to any other suitable method. Nodes 20 tune to the bearer channel of a transmitting node 20 for the time slot of the transmitting node 20 as specified by the schedule.

Modifications, additions, or omissions may be made to the method without departing from the scope of the invention. The method may include more, fewer, or other steps. Additionally, steps may be performed in any suitable order without departing from the scope of the invention.

Figure 4:
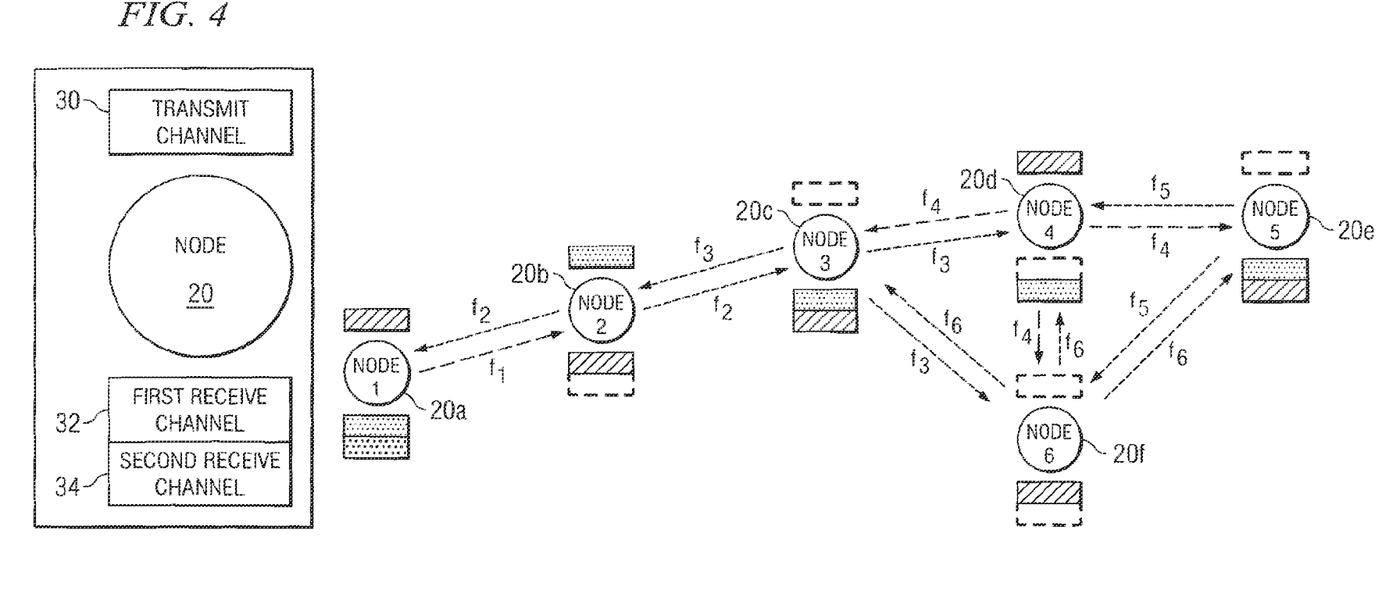
FIG. 4 is a diagram illustrating one embodiment of a transmitter-oriented (TO) method for using selected bearer channels for wireless nodes having multiple receivers.

FIG. 4 is a diagram illustrating one embodiment of a transmitter-oriented (TO) method for using selected bearer channels for nodes having multiple receivers. The method may be used for any suitable network of nodes, such as network 10 of nodes 20 of FIG. 1. According to the embodiment, nodes 20 may operate according to a carrier sense multiple access technique.

According to the key of FIG. 4, each node 20 transmits over its own bearer channel 30. Each node 20 may transmit over its own bearer channel in a manner similar to that described with reference to FIG. 3.

Each node 20 receives over two or more bearer channels. A bearer channel may be selected such that each neighbor node 20 that is one hop away from a transmitting node 20 has at least one receiver tuned to the bearer channel of the transmitting node 20. Accordingly, a node 20 has a receiver tuned to the bearer channel in use by its neighbor nodes 20. A hop may refer to a communication link between two nodes 20. In the example, node 1 receives over channels $f_2$ and $f_6$, node 2 receives over channels $f_1$ and $f_3$, node 3 receives over channels $f_1$ and $f_2$, node 4 receives over channels $f_2$ and $f_3$, node 5 transmits receives over channels $f_1$ and $f_2$, and node 6 transmits receives over channels $f_1$ and $f_3$.

Modifications, additions, or omissions may be made to the method without departing from the scope of the invention. The method may include more, fewer, or other steps. Additionally, steps may be performed in any suitable order without departing from the scope of the invention.

Figure 5:
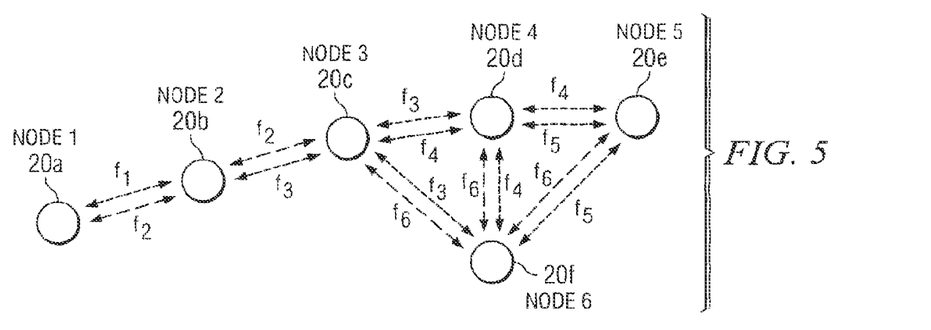
FIG. 5 is a diagram illustrating one embodiment of a destination-oriented (DO) method for using selected bearer channels for wireless nodes having a single receiver.

FIG. 5 is a diagram illustrating one embodiment of a destination-oriented (DO) method for using selected bearer channels for wireless nodes having a single receiver. The method may be used for any suitable network of nodes, such as network 10 of nodes 20 of FIG. 1. According to the embodiment, nodes 20 may operate according to a carrier sense multiple access (CSMA) technique.

According to the embodiment, when a node 20 has data to send to a one-hop neighbor destination node 20, the bearer channel of the destination node 20 is used for the handshake and data exchange.

The handshake and data exchange involve data source and destination transmitting, so both nodes 20 transmit and receive on the bearer frequency specified by the destination node 20. A handshake may refer to a CSMA handshake comprising a request to send (RTS) message, a clear to send (CTS) message, a data message, and an acknowledge (ACK) message.

According to the example, nodes 1 and 2 transmit and receive over channels $f_1$ and $f_2$ nodes 2 and 3 transmit and receive over channels $f_2$ and $f_3$, nodes 3 and 4 transmit and receive over channels $f_3$ and $f_4$, nodes 4 and 5 transmit and receive over channels $f_4$ and $f_5$, nodes 3 and 6 transmit and receive over channels $f_3$ and $f_6$, and nodes 5 and 6 transmit and receive over channels $f_5$ and $f_6$. According to the illustrated embodiment, channels $f_1$ and $f_3$ may be equal.

Modifications, additions, or omissions may be made to the method without departing from the scope of the invention. The method may include more, fewer, or other steps. Additionally, steps may be performed in any suitable order without departing from the scope of the invention.

Figure 6:
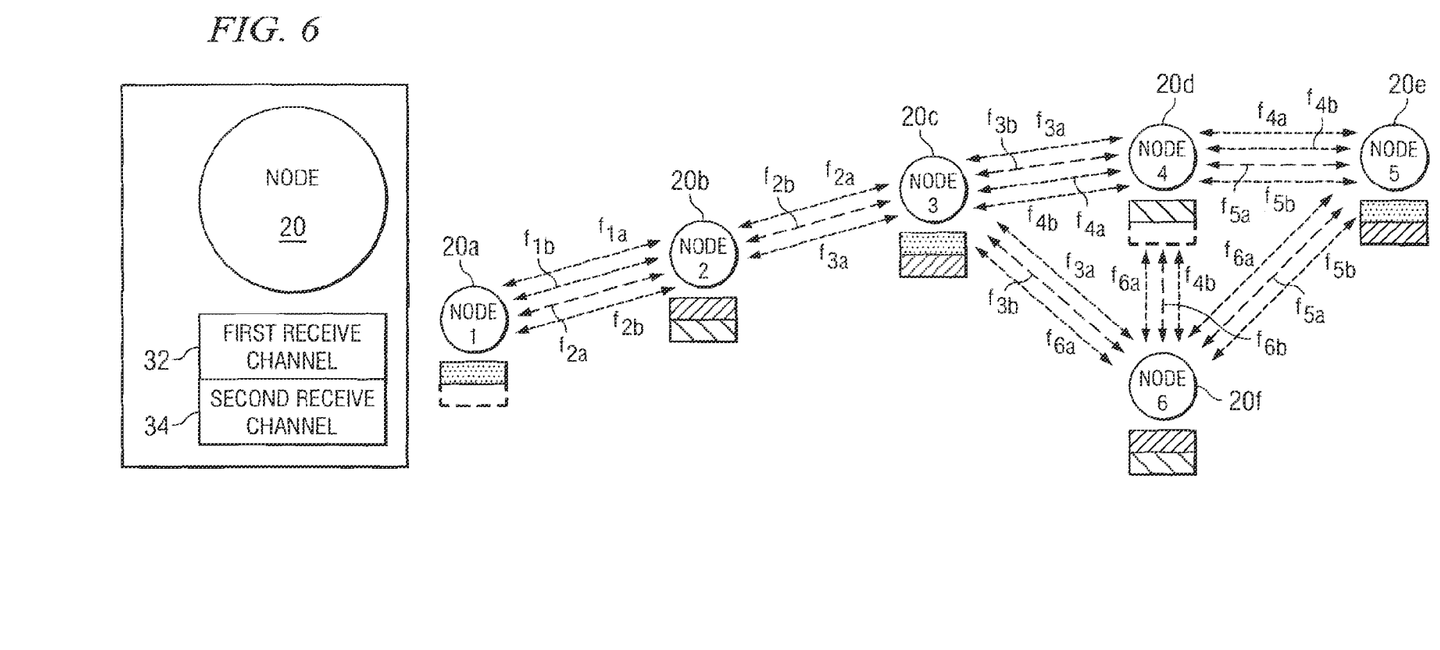
FIG. 6 is a diagram illustrating one embodiment of a destination-oriented (DO) method for using selected bearer channels for wireless nodes having multiple receivers.

FIG. 6 is a diagram illustrating one embodiment of a destination-oriented (DO) method for using selected bearer channels for nodes having multiple receivers. The method may be used for any suitable network of nodes, such as network 10 of nodes 20 of FIG. 1. According to the embodiment, nodes 20 may operate according to a carrier sense multiple access technique.

According to the embodiment, when a node 20 has data to send to a one-hop neighbor destination node 20, one of the two or more bearer channels of the destination node 20 is used for the handshake and data exchange. The handshake and data exchange involve data source and destination transmitting, so both nodes 20 transmit and receive on the bearer frequencies specified by the destination node 20. The bearer channels may be selected in a manner similar to that described with reference to FIG. 5.

According to the illustrated example, nodes 1 and 2 transmit and receive over channels $f_{1a}$, $f_{1b}$, $f_{2a}$, and $f_{2b}$; nodes 2 and 3 transmit and receive over channels $f_{2a}$, $f_{2b}$, $f_{3a}$; nodes 3 and 4 transmit and receive over channels $f_{3a}$, $f_{3b}$, $f_{4a}$, and $f_{4b}$; nodes 4 and 5 transmit and receive over channels $f_{4a}$, $f_{4b}$, $f_{5a}$, and $f_{5b}$; nodes 3 and 6 transmit and receive over channels $f_{3a}$, $f_{5b}$, and $f_{6a}$; and nodes 5 and 6 transmit and receive over channels $f_{5a}$, $f_{5b}$, and $f_{6a}$. According to the illustrated example, frequencies $f_{1a}$, $f_{3a}$, and $f_{5b}$ may be equal, frequencies $f_{1b}$ and $f_{4b}$ may be equal, and frequencies $f_{2b}$, $f_{4a}$, and $f_{6a}$ may be equal.

Modifications, additions, or omissions may be made to the method without departing from the scope of the invention. The method may include more, fewer, or other steps. Additionally, steps may be performed in any suitable order without departing from the scope of the invention.

Figure 7:
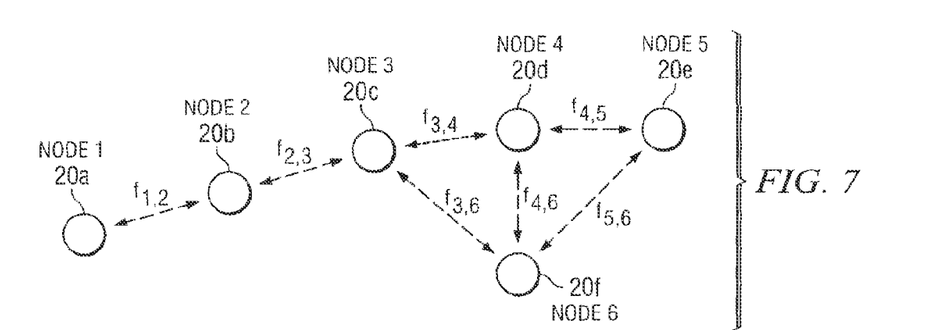
FIG. 7 is a diagram illustrating one embodiment of a link-oriented (LO) method for selecting and using bearer channels for wireless nodes having multiple receivers.

FIG. 7 is a diagram illustrating one embodiment of a link-oriented (LO) method for using selected bearer channels for wireless nodes having multiple receivers. The method may be used for any suitable network of nodes, such as network 10 of nodes 20 of FIG. 1. According to the embodiment, nodes 20 may operate according to a time division multiple access (TDMA) technique, a carrier sense multiple access (CSMA) technique, or any other suitable technique.

According to the embodiment, a node 20 may select a bearer channel for use on a link-by-link basis. The bearer channel may be used to both transmit and receive signals between a pair of nodes. In the illustrated embodiment, a frequency $f_{xy}$ may designate the frequency for a bearer channel between nodes x and y. A node 20 may communicate with a neighbor node 20 using the bearer channel specified for the link between them.

Modifications, additions, or omissions may be made to the method without departing from the scope of the invention. The method may include more, fewer, or other steps. Additionally, steps may be performed in any suitable order without departing from the scope of the invention.

Figure 8:
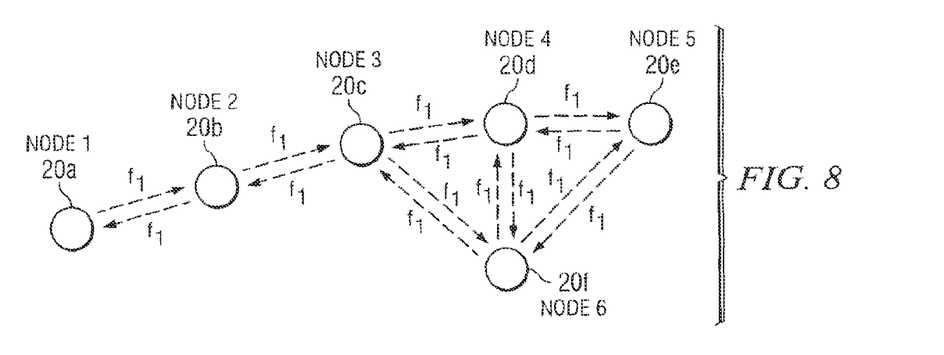
FIG. 8 is a diagram illustrating one embodiment of a group-oriented (GO) method for selecting and using bearer channels for wireless nodes having a single receiver.

FIG. 8 is a diagram illustrating one embodiment of a group-oriented method (GO) for using selected bearer channels for wireless nodes. The method may be used for any suitable network of nodes, such as network 10 of nodes 20 of FIG. 1. According to the embodiment, nodes 20 may operate according to a time division multiple access (TDMA) technique, a carrier sense multiple access (CSMA) technique, or any other suitable technique.

Nodes 20 may select a common bearer channel for use across nodes 20 of system 10. The nodes 20 transmit on the common bearer channel. When a new common bearer channel is selected, the nodes 20 switch to use the new channel. A master node 20 may notify nodes 20 of the selected bearer channel.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that individual wireless nodes are operable to independently select bearer channels used for communication between the wireless nodes. Accordingly, other network nodes do not need to select identical bearer channels.

A technical advantage of another embodiment may be that example methods for using selected bearer channels for wireless nodes are provided. As a first example, a transmission may use the bearer channel of a transmitting node for communication between the transmitting node and a destination node. As a second example, the transmission may use the bearer channel of a destination node. As a third example, each node may use bearer channels selected on a link-by-link basis. As a fourth example, a master node may select a bearer channel for use by the nodes.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for using one or more bearer channels by a node in an ad hoc network including the node and one or more neighbor nodes, the method comprising:
   establishing an adaptive channel operable to communicate a plurality of messages through the ad hoc network between the node and the one or more neighbor nodes;
   establishing information describing the one or more neighbor nodes, the information including whether time synchronization is available for bearer channels of each of the one or more neighbor nodes and whether a variable message length is available for bearer channels of each of the one or more neighbor nodes;
   selecting one or more bearer channels at the node in the ad hoc network independently from the one or more neighbor nodes for communicating with each of the one or more neighbor nodes based on whether time synchronization is available and whether the variable message length is available;
   notifying the one or more neighbor nodes of the one or more selected bearer channels using the adaptive channel; and
   communicating between the node and the one or more neighbor nodes over the one or more selected bearer channels, wherein when the node has data to send to a one-hop neighbor of the one or more neighbor nodes, a one of the bearer channels of the one-hop neighbor is selected for a handshake and data exchange with the one-hop neighbor.

2. The method of claim 1 wherein communicating between the node and the one or more neighbor nodes over the one or more selected bearer channels further comprises:
   using a bearer channel selected by the node when operating as a transmitting node; and notifying the one or more neighbor nodes of the one or more selected bearer channel.

3. The method of claim 1 wherein communicating between the node and the one or more neighbor nodes over the one or more selected bearer channels further comprises:
   using a bearer channel selected by the node when operating as a transmitting node; and
   notifying the one or more neighbor nodes of the selected bearer channel, the neighbor node located one or more hops away from the transmitting node, the neighbor node having at least one receiver of a plurality of receivers tuned to the selected bearer channel.

4. The method of claim 1 wherein communicating between the node and the one or more neighbor nodes over the one or more selected bearer channels further comprises:
   using a bearer channel selected by the node when operating as a destination node; and
   notifying the one or more neighbor nodes of the selected bearer channel.

5. The method of claim 1 wherein communicating between the node and the one or more neighbor nodes over the one or more selected bearer channels further comprises:
   using a bearer channel selected by the node when operating as a destination node; and
   notifying the one or more neighbor nodes of the selected bearer channel, a node operating as a transmitting node located one or more hops away from a neighbor node, the transmitting node and the destination node each having at least one receiver of a plurality of receivers tuned to the selected bearer channel.

6. The method of claim 1 wherein communicating between the node and the one or more neighbor nodes over one or more selected bearer channels further comprises:
using a bearer channel selected on a link-by-link basis.

7. The method of claim 1 wherein communicating between the node and the one or more neighbor nodes over one or more selected bearer channels further comprises:
receiving at the node a notification of the selected bearer channel from a master node of the plurality of wireless nodes; and
receiving at the one or more neighbor nodes the notification of the selected bearer channel from the master node.

8. A wireless node operable to communicate with one or more other wireless nodes, comprising:
an interface operable to send and receive signals; and
a processor operable to:
establish an adaptive channel operable to communicate a plurality of messages through an ad hoc network with the one or more other wireless nodes;
establish information describing the one or more other wireless nodes, the information including whether time synchronization is available for bearer channels of each of the one or more other wireless nodes and whether a variable message length is available for bearer channels of each of the one or more other wireless nodes;
independently select one or more bearer channels for communicating with each of the one or more other wireless nodes based on whether time synchronization is available and whether the variable message length is available;
notify one or more neighbor nodes from among the one or more other wireless nodes about the one or more selected bearer channels using the adaptive channel; and
communicate with the one or more other wireless nodes over the one or more selected bearer channels, wherein when the wireless node has data to send to a one-hop neighbor of the one or more neighbor nodes, a one of the bearer channels of the one-hop neighbor is selected for a handshake and data exchange with the one-hop neighbor.

9. The wireless node of claim 8 the processor further operable to:
notify the one or more other wireless nodes of the one or more selected bearer channels.

10. The wireless node of claim 8 the processor further operable to:
notify the one or more other wireless nodes of the one or more selected bearer channels, at least one of the one or more other wireless nodes of the one or more other wireless nodes located one or more hops away from the wireless node, the at least one other one of the one or more wireless nodes having at least one receiver of a plurality of receivers tuned to the selected bearer channel.

11. The wireless node of claim 8 the processor further operable to communicate with the one or more other wireless nodes over the one or more selected bearer channels by:
using the one or more bearer channels selected by the wireless node when operating as a transmitting node.

12. The wireless node of claim 8 the processor further operable to communicate with the one or more other wireless nodes over the one or more selected bearer channels by:
using the one or more bearer channels selected by the wireless node when operating as a destination node.

13. The wireless node of claim 8 the processor further operable to communicate with the one or more other wireless nodes over the one or more selected bearer channels by:
using the one or more bearer channels selected on a link-by-link basis.

14. The wireless node of claim 8 the processor further operable to communicate with the one or more other wireless nodes over the one or more selected bearer channels by:
receiving a notification of the one or more selected bearer channels from a master node.

15. A network for using one or more bearer channels for one or more wireless nodes, comprising:
a plurality of wireless nodes comprising:
a node; and
one or more neighbor nodes;
the plurality of wireless nodes each operable to:
establish an adaptive channel operable to communicate a plurality of messages through an ad hoc network between the node and the one or more neighbor nodes;
establish information describing the one or more neighbor nodes, the information including whether time synchronization is available for bearer channels of each of the one or more neighbor nodes and whether a variable message length is available for bearer channels of each of the one or more neighbor nodes;
independently select one or more bearer channels in each one of the plurality of wireless nodes based on whether time synchronization is available and whether the variable message length is available;
notify the one or more neighbor nodes of the node about the one or more selected bearer channels using the adaptive channel; and
communicate between the node and the one or more neighbor nodes over the one or more selected bearer channels, wherein when the node has data to send to a one-hop neighbor of one of the one or more neighbor nodes, a one of the bearer channels of the one-hop neighbor is selected for a handshake and data exchange with the one-hop neighbor.

16. The network of claim 15, the plurality of wireless nodes operable to communicate between the node and the one or more neighbor nodes over the one or more selected bearer channels by:
using a bearer channel selected by the node when operating as a transmitting node; and
notifying the one or more neighbor nodes of the selected bearer channel.

17. The network of claim 15, the plurality of wireless nodes operable to communicate between the node and the one or more neighbor nodes over the one or more selected bearer channels by:
using a bearer channel selected by the node when operating as a transmitting node; and
notifying the one or more neighbor nodes of the selected bearer channel, the neighbor node located one or more hops away from the transmitting node, the neighbor node having at least one receiver of a plurality of receivers tuned to the selected bearer channel.

18. The network of claim 15, the plurality of wireless nodes operable to communicate between the node and the one or more neighbor nodes over the one or more selected bearer channels by:
using a bearer channel selected by the node when operating as a destination node; and
notifying the one or more neighbor nodes of the selected bearer channel.

19. The network of claim 15, the plurality of wireless nodes operable to communicate between the node and the one or more neighbor nodes over the one or more selected bearer channels by:
- using a bearer channel selected by the node when operating as a destination node; and
- notifying the one or more neighbor nodes of the selected bearer channel, a node operating as a transmitting node located one or more hops away from a neighbor node, the transmitting node and the destination node each having at least one receiver of a plurality of receivers tuned to the selected bearer channel.

20. The network of claim 15, the plurality of wireless nodes operable to communicate between the node and the one or more neighbor nodes over the one or more selected bearer channels by:
- using the bearer channel selected on a link-by-link basis.

* * * * *